Patented Feb. 7, 1939

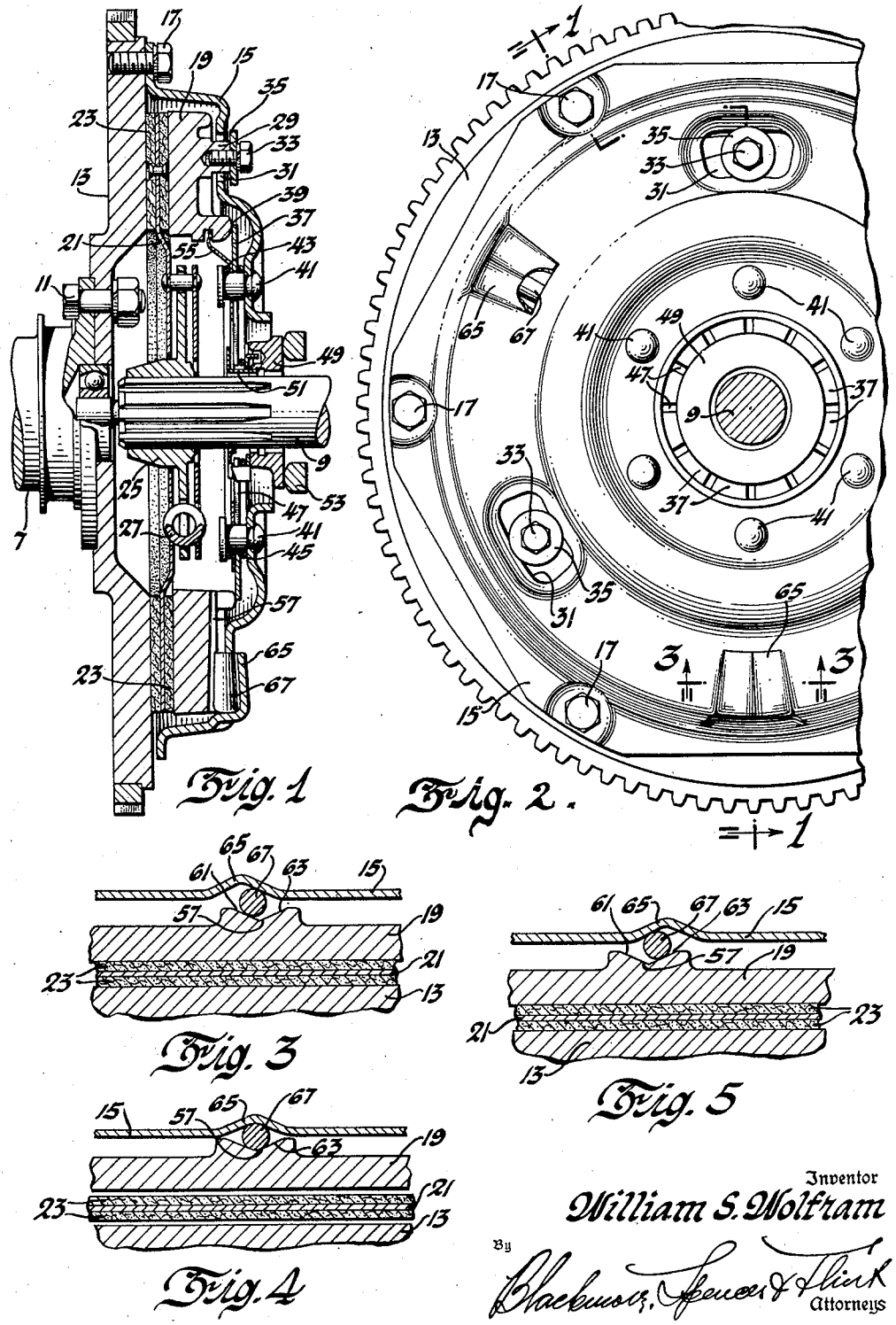

2,146,044

UNITED STATES PATENT OFFICE 2,146,044

CLUTCH

William S. Wolfram, Dayton, Ohio, assignor to General Motors Corporation, Detroit, Mich., a corporation of Delaware Application September 13, 1937, Serial No. 163,556

5 Claims. (Cl. 192—32)

This invention relates to friction clutches such as are used to couple the engine and transmission shafts of motor vehicles.

An object of the invention is to supplement the normal clutch engaging instrumentality with mechanism acting automatically to increase the gripping action between the driving and driven members.

A further object is to accomplish the above major object with a degree of efficiency varying with the tendency of the driving and driven members to slip relative to each other and effective to correct said tendency in either direction of rotation.

Associated with the above objects is an arrangement permitting the use of a lighter spring for the reason that its yielding action in effecting clutch engagement is supplemented by a servo device. Other objects and advantages will be understood from the following description.

In the accompanying drawing:

Figure 1 is a transverse section through the novel clutch, the section corresponding to line 1—1 of Figure 2.

Figure 2 is a view in elevation facing the cover plate.

Figure 3 is a section on line 3—3 of Figure 2.

Figures 4 and 5 are similar sections but with the parts displaced from the positions they occupy in Figure 3.

Referring by reference characters to the drawing, numeral 7 is used to designate the engine shaft and 9 the clutch driven shaft or transmission shaft. At 11 are shown fastening means which secure a flywheel 13 to the engine shaft. To the flywheel is secured a cover 15 by means of fastening devices 17. A pressure plate 19 within the cover is mounted to reciprocate axially relative to the flywheel and to grip a driven plate 21 having facings 23 between itself and the flywheel. The driven plate is associated with a hub 25 splined on the driven shaft 9, and between the hub 25 and the driven plate is cushioning spring means 27 such as is commonly employed. The pressure plate is formed with a plurality of axial lugs 29 extending through arcuate openings 31 in the cover. Cap screws 33 are threaded into the lugs and may engage washers 35 as shown. This last described arrangement provides for the pressure plate a limited rotary as well as axial movement.

The pressure plate may be actuated to clutch engaging position by some known form of spring. There is shown a coned spring plate 37 to serve this purpose. At its outer periphery it engages the pressure plate at 39. A plurality of shouldered rivets 41 arranged in a circular series are carried by the cover 15. Two rings 43 and 45 are positioned axially of the clutch by these rivets. The spring plate 37 has a circular series of openings so that it may be located on the rivets between the rings. Radially inward from the rivets the coned spring 37 is formed with slots 47, and its inner margin is secured to a collar 49 by an assembly for which no invention is here claimed but which is designated as a whole by numeral 51.

The spring plate normally exerts pressure on the pressure plate, moving it to the left in Figure 1, and the reaction is taken by the ring 45. When the collar 49 is moved to the left by the conventional clutch fork, only the ends 53 of which are shown, the load is taken from the ring 45 and assumed by the collar. The reciprocation of the collar then serves together with the fulcrum ring 43 to release the pressure plate from the spring pressure.

One or more resilient plate members 55 are used to positively withdraw the pressure plate when the clutch is released. One end of each member 55 may be anchored by a rivet 41 and the other end may be received within a notch of the pressure plate.

A plurality of radial recesses 57 are formed on the pressure plate, each recess having sloping surfaces 61 and 63. These recesses are on the side of the pressure plate facing the cover plate. Opposite the pressure plate recesses are similar V-shaped radial recesses 65 on the cover plate and between the mating recesses are tapered rollers 67 normally lying in the deep parts of the recesses. When the spring 37 is permitted to move the pressure plate in contact with the driven plate and thereby to push the latter against the flywheel, the pressure plate has a limited rotation relative to the flywheel and cover owing to the freedom of movement of the lugs 29 in the arcuate recesses 31. Such relative rotation causes a movement of the rollers 67 from the position shown in Figure 4 to that of either Figure 3 or Figure 5 depending upon whether the flywheel overruns the driven plate or the driven plate overruns the flywheel. In either event the pressure plate is moved axially away from the cover and thereby is more firmly pressed against the driven plate. There is thus added to the action of spring 37 an effective servo action tending to more effectively grip the driven plate. This makes possible the use of a relatively light clutch engaging spring and therefore one which can be more easily overcome by the releasing action of the throwout mechanism.

I claim:

1. In a clutch, a driving member, a pressure plate reciprocable axially relative to said driving member cooperating means on said driving member and pressure plate to permit and provide a limited relative movement of rotation, a driven member between said driving member and pressure plate, yielding means operable to move said pressure plate towards said driven member, and other means having cooperating parts carried by said pressure plate and driving member to supplement the action of said yielding means in response to said relative rotary movement.

2. In a clutch for motor vehicles, a flywheel, a cover secured thereto, a pressure plate within said cover, said pressure plate being mounted to move axially relative to said flywheel said pressure plate and cover formed with cooperating structure to provide a limited relative rotation, a driven member between said flywheel and pressure plate, yielding means between said cover and pressure plate to move said pressure plate towards said flywheel, and other means responsive to said relative rotation to urge said pressure plate towards said flywheel.

3. The invention defined by claim 2, said other means comprising opposed V-shaped recesses in said cover and pressure plate and rollers in said recesses.

4. The invention defined by claim 2, said other means comprising opposed radially directed V-shaped recesses in said cover and pressure plate and rollers in said recesses.

5. In a clutch for motor vehicles, a flywheel, a cover secured thereto to form an enclosure, a pressure plate axially reciprocable within said enclosure, a driven shaft extending into said enclosure and having a driven plate secured thereto and positioned between said flywheel and pressure plate, said pressure plate having axial lugs and said cover having elongated arcuate slots to receive said lugs whereby said pressure plate may have a limited rotary movement relative thereto, yielding means between said cover and pressure plate to move the latter to clutch engaging position, opposed V-shaped recesses in said cover and pressure plate and tapered rollers in said recesses whereby when said pressure plate engages said driven plate under the influence of said yielding means the consequent relative movement between said pressure plate and cover will actuate said roller and recess expedient and cause said pressure plate to be moved toward said driven plate thereby supplementing the action of said yielding means.

WILLIAM S. WOLFRAM.